United States Patent
Taniuchi et al.

(10) Patent No.: US 6,300,718 B1
(45) Date of Patent: Oct. 9, 2001

(54) LAMP WITH SWITCHING DEVICE AND CONTROL METHOD THEREOF

(75) Inventors: Hitoshi Taniuchi; Hiroshi Iwasaki, both of Tokyo; Masahito Okamoto, Kawasaki, all of (JP)

(73) Assignee: Stanley Electric Co., Ltd., Tokyo (JP)

( * ) Notice: Subject to any disclaimer, the term of this patent is extended or adjusted under 35 U.S.C. 154(b) by 0 days.

(21) Appl. No.: 09/383,407

(22) Filed: Aug. 26, 1999

(30) Foreign Application Priority Data

Aug. 28, 1998 (JP) .................................................. 10-243841

(51) Int. Cl.$^7$ ....................................................... B60Q 1/02
(52) U.S. Cl. ................................ 315/82; 315/83; 307/10.8
(58) Field of Search ................................... 362/507, 464, 362/467, 508, 523, 526, 286, 284, 272, 271; 315/82, 83; 313/156, 607, 113; 307/10.8

(56) References Cited

U.S. PATENT DOCUMENTS

| 4,208,615 | * | 6/1980 | Jones et al. | ............................. 315/83 |
| 4,857,794 | * | 8/1989 | Watanabe | ............................. 313/113 |
| 5,536,975 | * | 7/1996 | Jennings | ............................. 307/10.8 |
| 5,997,162 | * | 12/1999 | English et al. | ....................... 362/508 |

FOREIGN PATENT DOCUMENTS

4435507A1  4/1996  (DE) .
10-092208  4/1998  (JP) .

* cited by examiner

*Primary Examiner*—Haissa Philogene

(57) ABSTRACT

A headlight includes a beam-type switching device equipped with an electrical power limiting device. The power limiting device can lower operational electrical power after a certain time interval has passed following initial application of operational electrical power to the switching device. The switching device can include an electromagnetic solenoid 5a with a coil. Sufficient electrical current can be applied to the switching device for an initial period when electromagnetic solenoid 5a requires comparatively high operational electrical power, and an electrical power limiting device can lower the electrical power applied to the switching device after a short time period. The size and cost of the switching device can be reduced, overheating can be avoided, and the longevity and reliability of the device can be increased.

16 Claims, 3 Drawing Sheets

LAMP WITH SWITCHING DEVICE AND CONTROL METHOD THEREOF

This application claims the benefit of Japanese Application No.10-243841, filed in Japan on Aug. 28, 1998 which is hereby incorporated by reference.

BACKGROUND OF THE INVENTION

1. Field of the Invention

The invention relates to a method and apparatus for control of a lamp. Specifically, the invention is directed to a method and apparatus for controlling a vehicle headlight that uses a single light source (such as a metal halide discharge lamp, etc.) and that is equipped with a beam-type switching device for switching between high beam and low beam.

2. Discussion of the Related Art

FIG. 7 shows an example of the construction of a related art type headlamp 90. This headlamp 90 is equipped with a light source base 91, which has a fulcrum 91a. A single light source 92 attached to light source base 91 has a lumination source 92a. A solenoid 93 is provided at the tip of the opposite side of fulcrum 91a of light source base 91. Beam-type switching is carried out by activating solenoid 93 and shifting the lumination source 92a relative to reflector 94 from a low beam position to a high beam position.

The solenoid 93 must maintain lumination source 92a in the high beam position during the time period in which the vehicle is driven in the high beam position. It is anticipated that the application of operational electrical power to the solenoid 93 will occur continuously for a rather long time period, for example, during lengthy travel on a high-speed highway. Lumination source 92a returns from the high beam position to the low beam position upon deactivation of the solenoid 93.

However, the solenoid 93 utilized by the related art headlight 90 requires comparatively high electrical power at the start of movement from the low beam position to the high beam position since plunger 93b is distant from solenoid body 93a at the start of movement.

Although sufficient electrical power is supplied to begin movement of solenoid 93, as explained previously, this same electrical power is then continuously applied during the time that the vehicle is driven while using the high beam. Therefore excessive heating due to the continuous application of a great deal of electrical power to solenoid 93 occurs and a large-scale size solenoid 93 is necessary to avoid overheating. The related art headlight results in problems to be solved such as higher cost, increased weight, overheating, malfunctioning, etc.

SUMMARY OF THE INVENTION

In order to solve the above mentioned problems, the invention relates to a method for controlling a switching device for switching between high beam and low beam in a vehicle lamp which includes providing an initial application of operational electrical power to the switching device, and lowering said operational electrical power after a specific time period has passed after initial application of operational electrical power. The invention also relates to an apparatus such as a headlight capable of switching between a high beam mode and a low beam mode including a switching device activatable by an initial application of operationally electrical power, and electrical power reducing means for lowering said operational electrical power after a specific time period has passed after initial application of operational electrical power.

DETAILED DESCRIPTION OF THE PREFERRED EMBODIMENTS

Figure 1:
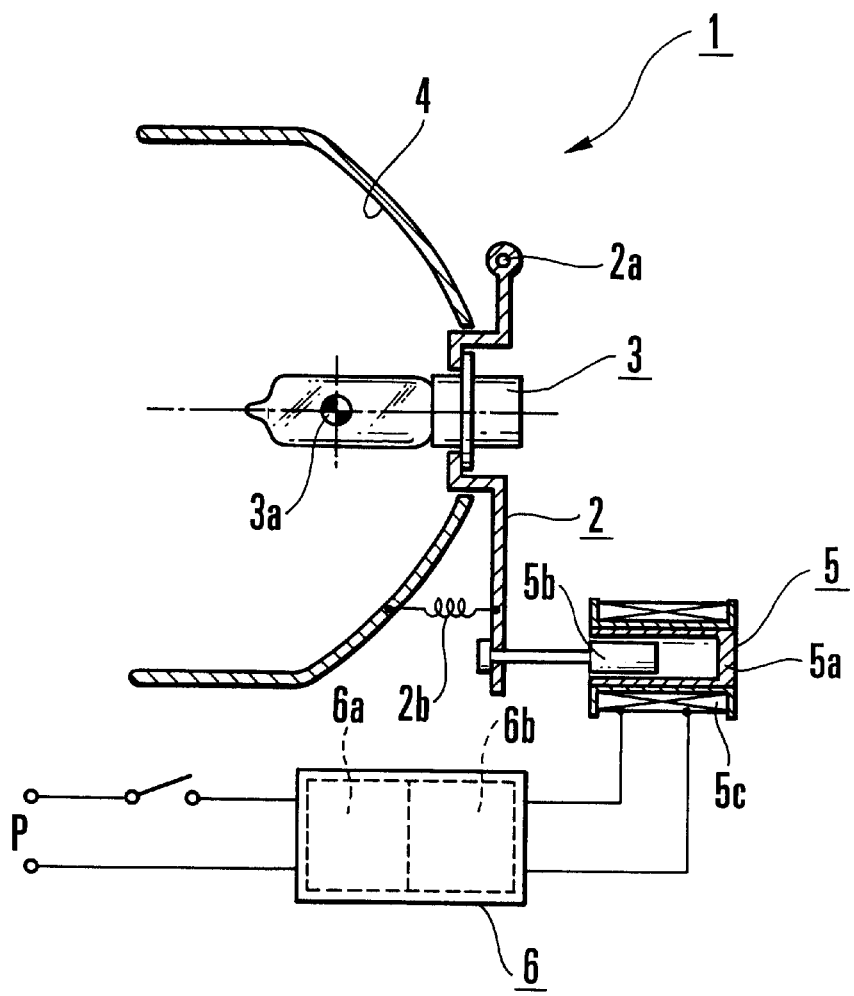
FIG. 1 is a cross-sectional drawing of an embodiment of the invention in which a headlight includes a beam-type switching device.

The invention is explained below in detail based upon working embodiments as shown in the drawings. FIG. 1 shows an embodiment of the invention in which a headlamp 1 includes a beam-type switching device. Headlamp 1 can include a light source base 2 which is constructed from appropriate components such as fulcrum 2a. Lumination source 3a of light source 3 can be attached to the light source base 2 and moved relative to reflector 4 between a low beam position and a high beam position.

An electromagnetic solenoid 5 can be used to switch the lumination source 3a to the high beam position. A return spring 2b can be used to return light source base 2 to the low beam position. Operational electric power can be applied to the above mentioned electromagnetic solenoid 5 via an operational circuit 6 which include a timer 6a and oscillator 6b.

The characteristics of the above mentioned electromagnetic solenoid 5 will be explained below. A large amount of operational electric power to activate the solenoid 5 is required when plunger 5b and solenoid body 5a are separated from each other (that is to say, at the start of switching from the low beam position to the high beam position). When plunger 5b is pulled inward so that plunger 5b and solenoid body 5a are engaged (that is to say, during maintenance of the high beam position), the electric power necessary to maintain the position of the plunger requires far less operational electrical power.

Figure 2:
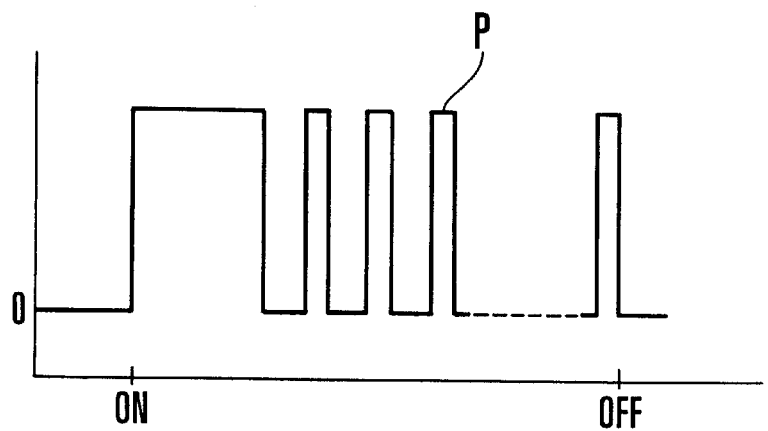
FIG. 2 is a graph showing operational electrical power applied to the embodiment of the invention shown in FIG. 1.

FIG. 2 is a graph that shows the performance of the above mentioned operational circuit 6 according to the characteristics of the electromagnetic solenoid 5. During a short time period after the start of application of operational electrical power P to electromagnetic solenoid 5, the above mentioned timer 6a controls operation of the above mentioned oscillator 6b. Morover, timer 6a performs duty control as the above mentioned oscillator 6b supplies an appropriate fractional ratio of electrical power to electromagnetic solenoid 5.

The time period setting of the timer 6a is preferably long enough for the solenoid 5 to carry out its operations. Specifically, the electromagnetic solenoid 5 has a typical response time of 0.5 seconds. Therefore, the above mentioned timer should use, for example, a 1 second time period setting.

After the set time period for the timer 6a has passed, duty control is performed so that the above mentioned oscillator 6b reduces operational electrical power to an appropriate value. The duty control ratio at this time should be such that sufficient operational electrical power is provided to maintain light source 3 in the high beam position.

Results will now be explained for the use of the headlight 1 of the invention constructed in the above mentioned manner. First, when operational electrical power is applied to electromagnetic solenoid 5, operational of oscillator 6b is controlled by timer 6a. Therefore, the operational electrical power is applied in its entirety to electromagnetic solenoid 5, and reliable switching of light source 3 (lumination source 3a) can occur from the low beam position to the high beam position.

Duty control of oscillator 6b can then be carried out to lower operational electrical power down to the electrical power needed after switching. Therefore, even when driving for a long period of time using the high beam and requiring the electromagnetic solenoid 5 to be operated for a long time period, heat generated by this electromagnetic solenoid 5 is minimal. Therefore, the electrical power consumption and the size of electromagnetic solenoid 5 can be reduced.

Figure 3:
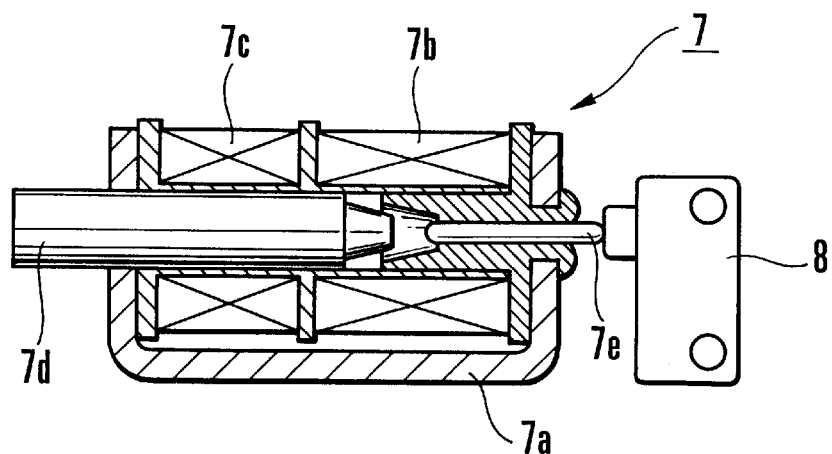
FIG. 3 is a cross-sectional drawing of components of another embodiment of the invention.

FIG. 3 shows another embodiment of the invention. The embodiment shown in FIG. 1 utilizes operational circuit 6 to lower electrical power consumption while maintaining the high beam position without decreasing the operational characteristics of electromagnetic solenoid 5. However, for the embodiment shown in FIG. 3, electromagnetic solenoid 7 performs the function of reducing electrical power while keeping the headlamp in the high beam position, etc.

In the embodiment shown in FIG. 3, body 7a of the electromagnetic solenoid 7 can include a main coil 7b and a secondary coil 7c located within body 7a. Pin 7e can be provided at the retraction-position end of plunger 7d and can be pushed by plunger 7d so as to open the normally closed limit switch 8.

Figure 4:
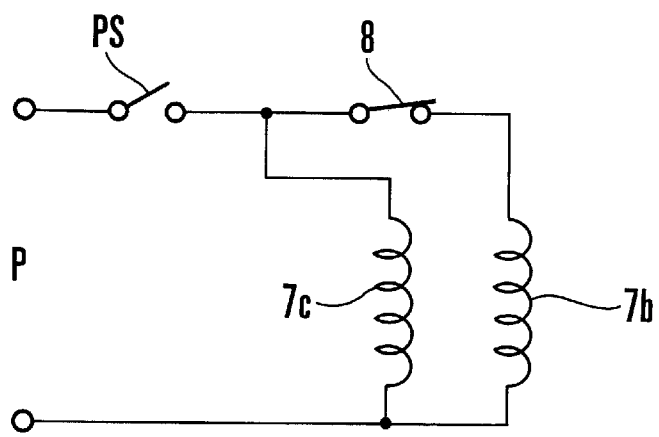
FIG. 4 is a circuit diagram showing the wiring layout of the embodiment of FIG. 3.

FIG. 4 is a circuit diagram showing the wiring layout of the embodiment of FIG. 3. The main coil 7b can be connected to operational electrical power P through the limit switch 8. The secondary coil 7c can be directly connected to operational electrical power P. When light source 3 is in the low beam position, solenoid 7 is not operated, and limit switch 8 is in the closed state.

Beam switch PS can be provided near the driver's seat or in any other convenient location. When beam switch PS is closed at the start of operation, both main coil 7b and secondary coil 7c are connected to operational electrical power P. Plunger 7d then quickly operates to switch light source 3 to the high beam position, causing limit switch 8 to open. Accordingly, electricity supplied to main coil 7b is halted after the light source 3 is switched to the high beam position. Thereafter, light source 3 is maintained in the high beam position by supply of low electrical power to secondary coil 7c.

Figure 5:
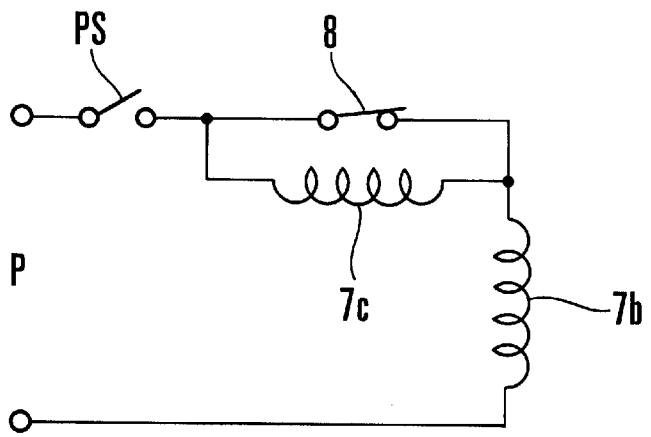
FIG. 5 is a circuit diagram showing the wiring layout of another embodiment of the invention.

FIG. 5 is a circuit diagram showing the wiring layout of another embodiment of the invention. Electromagnetic solenoid 7 has the same construction as in the embodiment of FIG. 3, except that the main coil 7b and secondary coil 7c of the embodiment shown in FIG. 5 are connected in series. The limit switch 8 is connected so as to short circuit secondary coil 7c in the embodiment of FIG. 5.

When beam switch PS is closed, operational electrical power P is only supplied to main coil 7b at the start of operation. Main coil 7b is preferably formed so as to be sufficient for operation of electromagnetic solenoid 7 during the initial operating period.

When light source 3 is switched to the high beam position, limit switch 8 then opens. Since main coil 7b and secondary coil 7c are connected in series to operational electrical power P, after limit switch 8 opens, resistance increases so as to lower the supplied operational electrical power P. Accordingly, similar results are obtained as compared to the embodiments of FIGS. 1 and 4. In addition, for either of the embodiments of FIGS. 4 and 5, it is also permissible to utilize an electrical device (such as the timer 6a of the embodiment shown in FIG. 1), and omit pin 7e, to carry out an operation that is equivalent to the opening-closing of limit switch 8.

Figure 6:
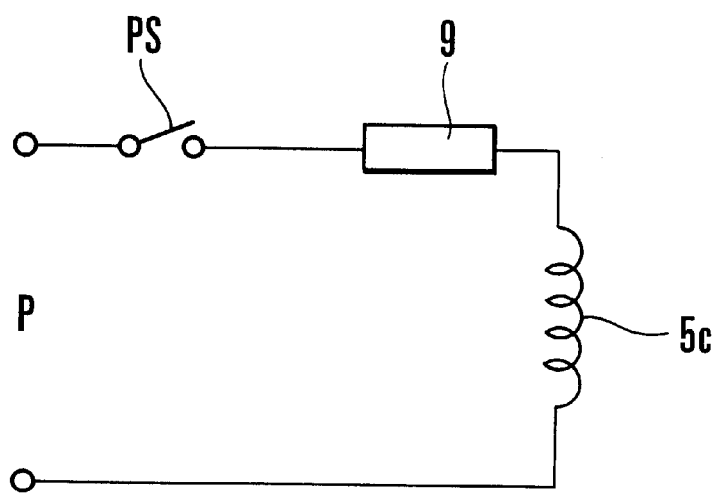
FIG. 6 is a circuit diagram showing the wiring layout of another embodiment of the invention.
Figure 7:
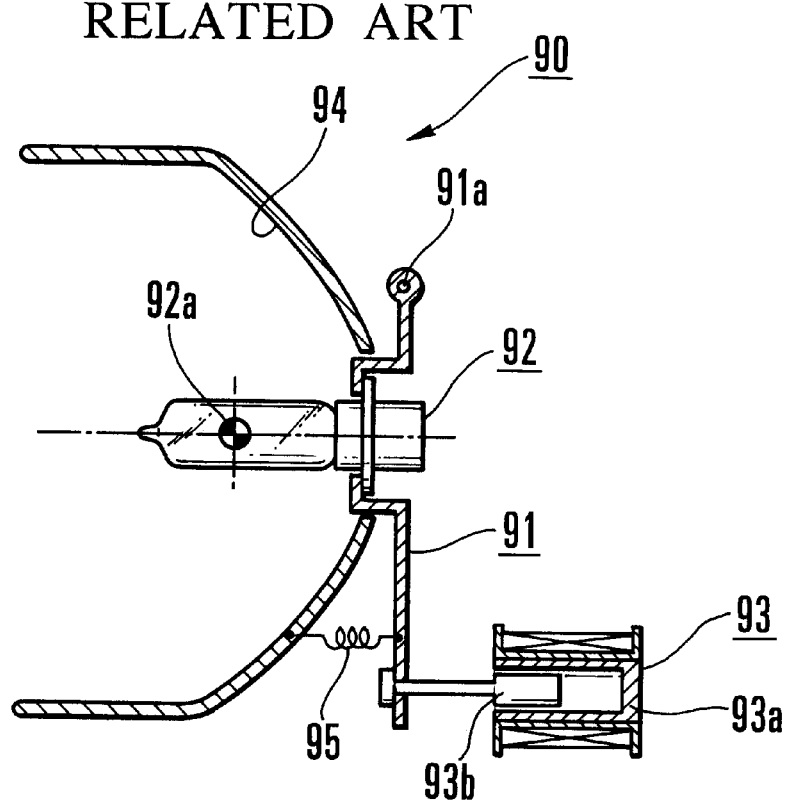
FIG. 7 is a cross-sectional drawing of a related art headlight.

FIG. 6 is a circuit diagram that shows another embodiment of the invention. Electromagnetic solenoid 5 of the embodiment shown in FIG. 6 has a single coil 5c like that of the embodiment shown in FIG. 1. In addition, coil 5c of this fourth embodiment is connected in series with a PTC (Positive Temperature Coefficient) element 9. This PTC element 9 is characterized by an increasing resistance as temperature increases and by low resistance at normal temperatures.

In the embodiment of FIG. 6, no particular restriction is placed upon operational electrical power P applied to the electromagnetic solenoid 5 when operational electrical power P is first applied to electromagnetic solenoid 5. However, as the time period over which operational electrical power P is applied lengthens, PTC element 9 resistance increases due to heat generating by PTC element 9. Accordingly, PTC element acts to decrease the operational electrical power P applied to electromagnetic solenoid 5.

As explained above, the invention can include a headlight with a beam-type switching device that uses an electromagnetic solenoid to switch between high beam and low beam. The beam-type switching device can be equipped with an electrical power reducing means that lowers operational electrical power after a specific time period has passed after initial application of operational electrical power to the electromagnetic solenoid. Sufficient electrical current is thereby applied during the starting time period of the headlight, during which the electromagnetic solenoid requires comparatively high operational electrical power. Operational electrical power is then reduced by the electrical power reducing means after the specific time period. Therefore, it is permissible to use a smaller-scale electromagnetic solenoid instead of the larger solenoid that must be capable of withstanding continuous application of the starting operational electrical power. The invention results in decreased cost, smaller size, lighter weight, higher reliability, less overheating, and excellent power reduction.

Many variations of the specific components of the invention can be made without departing from the scope of the invention. For example, the electrical power reducing means can include any type of device, either electrical, mechanical or electromechanical, that reduces power to the switching device after a certain period of time. In addition, the invention can be incorporated into any type of lighting device in which movement between two different positions for the light source is desirable. The specific wiring construction can also differ from that disclosed without departing from the spirit and scope of the invention.

What is claimed is:

1. A method for controlling a switching device for switching a position of a vehicle lamp structure between high beam position and low beam position in a vehicle lamp, comprising:

providing an initial application of operational electrical power to the switching device;

switching the position of the vehicle lamp structure between high beam position and low beam position in the vehicle lamp in response to the initial application of operational electrical power; and lowering said operational electrical power after a specific time period has passed after initial application of operational electrical power.

2. The method for controlling a switching device as claimed in claim 1, wherein beam-type switching is carried out by an electromagnetic solenoid that includes a coil, and an electrical power reducing means controls the operational electrical power imparted to said coil of the electromagnetic solenoid.

3. A headlight capable of switching a position of a lamp structure between a high beam mode position and a low beam mode position, comprising:

a lamp structure capable of moving between a high beam mode position and a low beam mode position;

a switching device operationally connected to the lamp structure to move the lamp structure between the high beam mode position and low beam mode position, and activatable by an initial application of operational electrical power; and electrical power reducing means for lowering said operational electrical power after a specific time period has passed after initial application of operational electrical power.

4. The headlight as claimed in claim 3, wherein said electrical power reducing means includes two coils connected in parallel, and operational electrical power to one of said coils can be disconnected after said specific time period has passed.

5. The headlight as claimed in claim 3, wherein said electrical power reducing means includes two coils connected in series with a switch capable of shorting electricity around one of said coils before said specified time period has passed.

6. The headlight as claimed in claim 3, wherein said electrical power reducing means includes PTC element connected in series to a coil.

7. The headlight as claimed in claim 3, wherein said electrical power reducing means using a coil includes a timer and an oscillator, and said specific time period is set by a timer that is started by application of electrical power to said coil.

8. The headlight as claimed in claim 3, wherein said switching device includes an electromagnetic solenoid that has a plunger moveable between an extended position and a retracted position, and start of said specific time period is set by operation of a limit switch detecting when the electromagnetic solenoid plunger approaches said retraced position.

9. A switching device for switching between high beam and low beam in a lamp, comprising:

a mount structure movable between a first and second position;

an activation mechanism attached to said mount structure capable of moving said mount structure between said first and second position upon an initial application of operational electrical power; and electrical power reducing means that lowers operational electrical power after a specific time period has passed after said initial application of operational electrical power.

10. A lamp capable of switching between a high beam mode and a low beam mode, comprising:

a lamp housing;

a light source base located in said lamp housing and moveable between a high beam position and a low beam position;

a switching device located adjacent said light source base and capable of moving said light source base between said high beam position and said low beam position upon application of an operational power to said switching device; and a power controlling structure located within said lamp housing, said power controlling structure capable of changing the operational power applied to said switching device.

11. The lamp as claimed in claim 10, further comprising:

a timing structure located within the lamp and operatively connected to the power controlling structure to activate the power controlling structure after a predetermined period of time in which power is applied to the switching device.

12. The lamp as claimed in claim 11, wherein said power controlling structure includes two coils electrically connected in parallel such that operational power can be disconnected from one of said coils after said predetermined period of time has passed.

13. The lamp as claimed in claim 11, wherein said power controlling structure includes two coils electrically connected in series and a switch capable of shorting electricity around one of said coils before said predetermined period of time has passed.

14. The lamp as claimed in claim 11, wherein said power controlling structure includes a coil, and said timing structure is started by application of electrical power to said coil.

15. The lamp as claimed in claim 11, wherein said switching device includes an electromagnetic solenoid that has a limit switch and a plunger which is moveable between an extended position and a retracted position, and start of said predetermined period of time is set by operation of said limit switch detecting when the electromagnetic solenoid plunger approaches said retracted position.

16. The lamp as claimed in claim 10, wherein said power controlling structure includes a PTC element connected in series to a coil.

* * * * *